US011669312B2

(12) United States Patent
Drepper

(10) Patent No.: US 11,669,312 B2
(45) Date of Patent: Jun. 6, 2023

(54) PROFILING AND OPTIMIZATION OF COMPILER-GENERATED CODE

(71) Applicant: RED HAT, INC., Raleigh, NC (US)

(72) Inventor: Ulrich Drepper, Grasbrumn (DE)

(73) Assignee: Red Hat, Inc., Raleigh, NC (US)

( * ) Notice: Subject to any disclaimer, the term of this patent is extended or adjusted under 35 U.S.C. 154(b) by 86 days.

(21) Appl. No.: 17/242,139

(22) Filed: Apr. 27, 2021

(65) Prior Publication Data

US 2022/0342647 A1 Oct. 27, 2022

(51) Int. Cl.
*G06F 8/41* (2018.01)
(52) U.S. Cl.
CPC .................................. *G06F 8/443* (2013.01)
(58) Field of Classification Search
CPC ....................................................... G06F 8/443
USPC ......................................................... 717/158
See application file for complete search history.

(56) References Cited

U.S. PATENT DOCUMENTS

| | | | | |
|---|---|---|---|---|
| 7,386,838 | B2 | 6/2008 | Schmidt | |
| 8,214,191 | B2 * | 7/2012 | Ferren | G06F 11/3466 703/22 |
| 8,762,951 | B1 * | 6/2014 | Kosche | G06F 11/3476 717/127 |
| 2004/0143825 | A1 | 6/2004 | Hicks | |
| 2013/0080760 | A1 * | 3/2013 | Li | G06F 11/3447 713/100 |
| 2014/0281434 | A1 * | 9/2014 | Madriles | G06F 9/30076 712/227 |
| 2018/0336057 | A1 * | 11/2018 | Yamamoto | G06F 11/0751 |
| 2020/0004541 | A1 * | 1/2020 | Sankaranarayanan | G06F 12/0862 |

OTHER PUBLICATIONS

Title: Seeds: A software engineer's energy-optimization decision support framework, author: I Manotas,, published on 2014.*
Title: Continuous program optimization: A case study, author: T Kistler, published on 2003.*
Hamid Mushtaq, et al. "A Runtime Profiler: Toward Virtualization of Polymorphic Computing Platforms." 2010 International Conference on Reconfigurable Computing, IEEE, Dec. 13, 2010. pp. 144-149.

(Continued)

*Primary Examiner* — Chameli Das
(74) *Attorney, Agent, or Firm* — Lowenstein Sandler LLP

(57) ABSTRACT

The technology disclosed herein enables a processor to receive program code comprising a plurality of program code instructions generated by a compiler in view of source code, identify, among the program code instructions, one or more optimizable instructions, wherein at least one of the optimizable instructions is associated with an execution characteristic, and the execution characteristic is associated with an optimization decision, identify a profiling instruction location associated with the at least one of the optimizable instructions, and add a profiling instruction to the program code at the profiling instruction location. The at least one profiling instruction comprises a profiling identifier, and causes the processing device to: generate a profiling information item in view of the execution characteristic of the optimizable instructions, and store the profiling information item in a persistent memory region at a memory location corresponding to the profiling identifier.

20 Claims, 9 Drawing Sheets

(56) References Cited

OTHER PUBLICATIONS

"Storing Profiling Information for Use in Future Virtual Machine Invokations for Optimization Decisions ED—Dari Kuhn." IP.Com Inc., Mar. 29, 2012. 2 pages.
Heil T. et al. "Relational Profiling: Enabling Thread-Level Parallelism In Virtual Machines." IEEE International Symposium on Microarchitecture, Dec. 10-13, 2000. pp. 281-290.
European Search Report received for European Patent Application No. 21177965.7-1224, dated Nov. 24, 2021. 13 Pages.

* cited by examiner

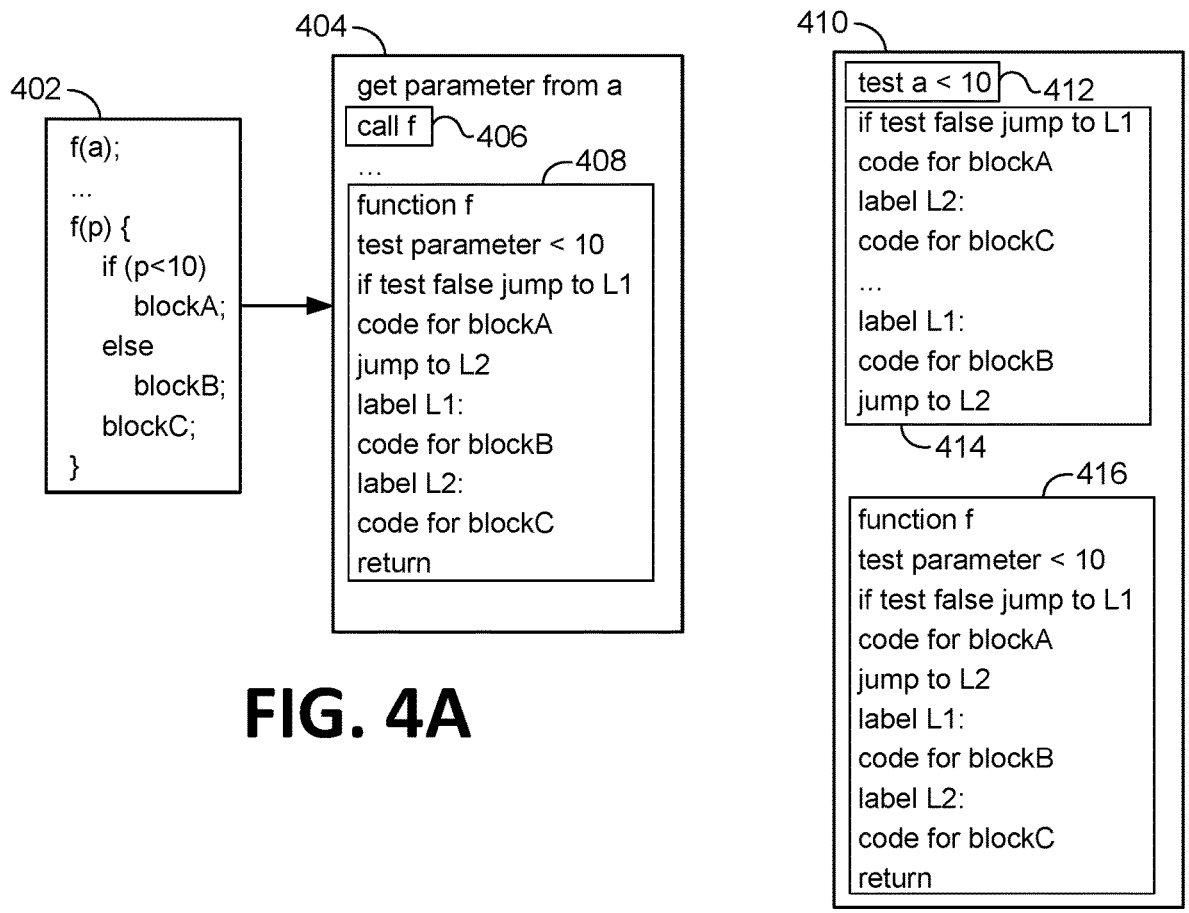
FIG. 4A
FIG. 4B
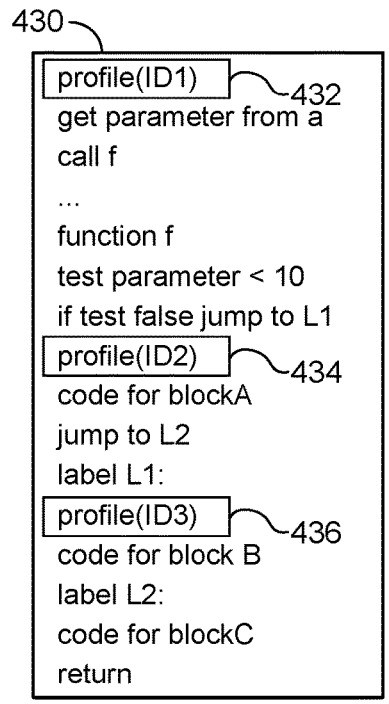
FIG. 4C

```
                                                    ┌─ 501
                                                    ▼

┌─────────────────────────────────────────────────────────────────┐
│ Execute first program code that includes at least one profiling │
│ instruction that generates a profiling information item and     │
│ stores the profiling information item in a persistent memory    │
│ region at a memory location that corresponds to a profiling     │
│ identifier associated with the profiling instruction            │
│                              550                                │
└─────────────────────────────────────────────────────────────────┘
                                │
                                ▼
┌─────────────────────────────────────────────────────────────────┐
│ Generate, by a compiler, second program code comprising a       │
│ second plurality of program code instructions in view of source │
│ code associated with the first program code                     │
│                              560                                │
│  ┌───────────────────────────────────────────────────────────┐  │
│  │ Determine whether to generate one or more optimized       │  │
│  │ instructions in view of the profiling information item    │  │
│  │ stored in the persistent memory region at the memory      │  │
│  │ location that corresponds to the profiling identifier     │  │
│  │                           570                             │  │
│  └───────────────────────────────────────────────────────────┘  │
│                                │                                │
│                                ▼                                │
│  ┌───────────────────────────────────────────────────────────┐  │
│  │ Responsive to determining that the optimized instructions │  │
│  │ are to be generated, generating the optimized             │  │
│  │ instructions, wherein the second plurality of program     │  │
│  │ code instructions includes the optimized instructions     │  │
│  │                           580                             │  │
│  └───────────────────────────────────────────────────────────┘  │
└─────────────────────────────────────────────────────────────────┘
```

FIG. 5B

PROFILING AND OPTIMIZATION OF COMPILER-GENERATED CODE

TECHNICAL FIELD

The present disclosure is generally related to computer systems, and more particularly, to providing profiling an optimization of compiler-generated code.

BACKGROUND

Source code that implements a computer application may be translated by a compiler from a high-level language, such as a list of human-readable instructions, into lower-level code that is more suitable for execution by hardware such as a Central Processing Unit (CPU) of a computer system. The lower-level code may be assembler code comprising a sequence of processor instructions, for example. The compiler may perform code optimization to improve the efficiency of program code while retaining the semantics of the program code. Code optimization may involve performing transformations on the program code that are expected to improve efficiency by, for example, producing program code that runs faster or uses less memory. A profiling tool may be used to analyze a program's behavior using profiling information gathered as the program runs.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 4A depicts example source code and example generated program code that includes a function inlining optimization decision, in accordance with one or more aspects of the present disclosure;

FIG. 4B depicts example program code that includes a function inlining optimization, in accordance with one or more aspects of the present disclosure;

FIG. 4C depicts example program code that includes profiling instructions related to a function inlining optimization decision, in accordance with one or more aspects of the present disclosure;

FIG. 5B depicts a flow diagram of an example method for generating optimized program code using profiling information stored in a persistent memory region, in accordance with one or more aspects of the present disclosure;

DETAILED DESCRIPTION

Figure 1:
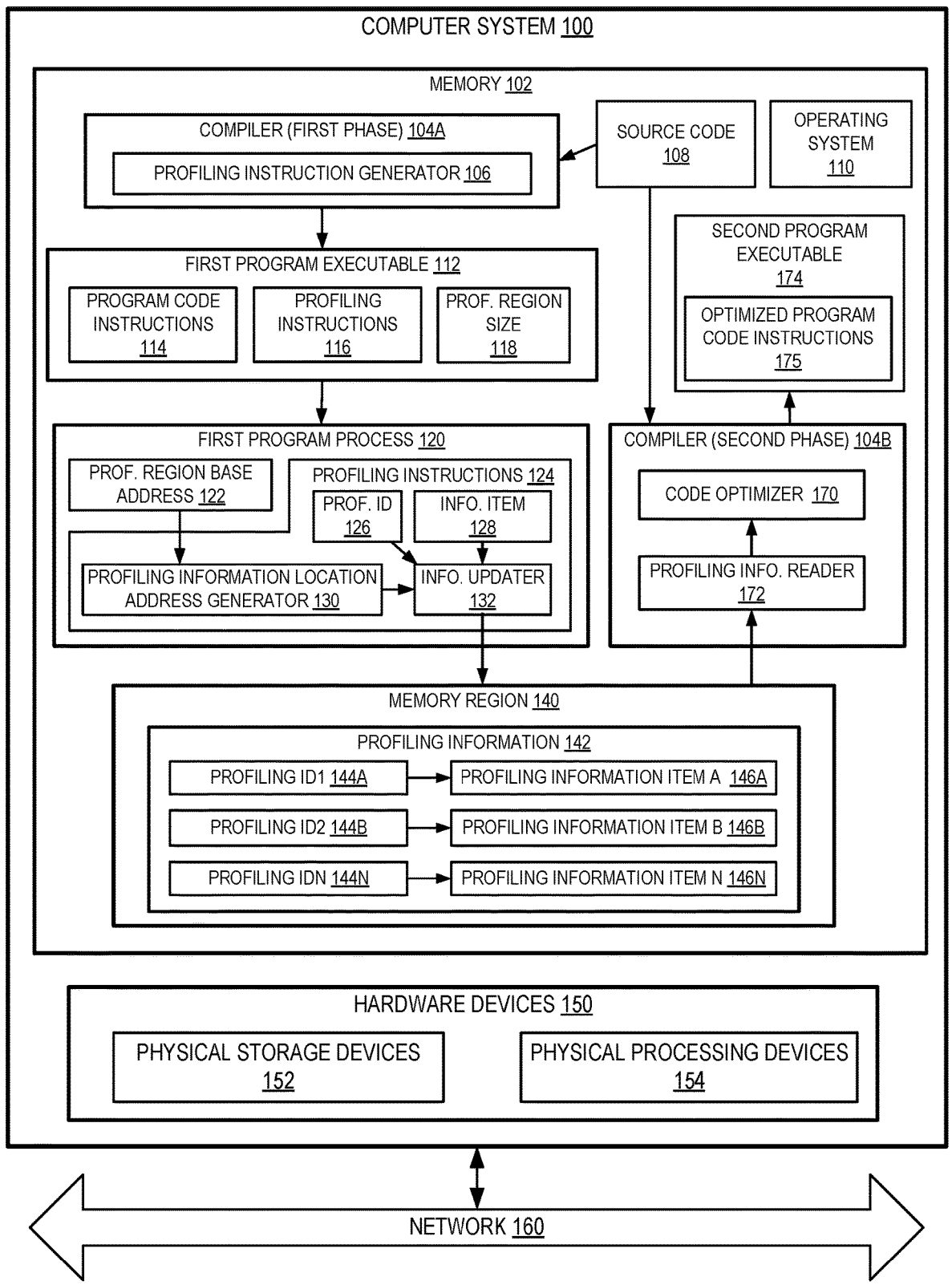
FIG. 1 depicts a high-level block diagram of an example host computer system that performs profile-guided optimization using profiling information stored in persistent memory, in accordance with one or more aspects of the present disclosure.

Described herein are systems and methods for generating optimized computer program code using profiling information stored in a persistent memory region. Compilers translate source code to lower-level code, such as processor instructions, and may perform optimizations that are expected to improve characteristics of the lower-level code. Optimized program code herein shall refer to program code that is expected to have an improvement in a performance characteristic, such as execution time or program code size, in comparison to alternative (e.g., non-optimized) program code. However, code optimization is a difficult problem in general, and optimizations that are expected to improve performance may actually have little impact or even reduce performance. Further, the amount of time that may reasonably be dedicated to optimization by the compiler is limited. Users of the compiler prefer not to wait long periods of time for the compiler to perform optimization, for example. Profiling techniques may be used to gather profiling information that characterizes the execution of program code. The profiling information may be analyzed to identify portions of the program code that are executed frequently or use a substantial amount of execution time. The identified portions may be optimized, e.g., by modifying the identified portions of the program code to execute more efficiently. However, existing profiling techniques involve generating a profiling file containing profiling information for each run of each program, and analyzing the profiling file or providing the profiling file to an optimizing compiler for re-compilation.

Generating profiling files adds complexity to the build process, which includes compilation and related operations such as linking. A different profiling file may be generated for each run of a program, for example. Thus, combining profiling information from multiple runs of a program is difficult.

Aspects of the present disclosure address the above-noted and other deficiencies by providing technology that may improve the performance of program code by storing and accessing profiling information in a memory region that can be shared and persist between runs of the program code, and using the profiling information to make optimization decisions. A profiling system may generate program code containing profiling instructions that store profiling information in the memory region. The profiling instructions may be generated by a compiler or profiling tool, for example. The program code may be run one or more times to generate profiling information. In each run, the profiling instructions may generate/update the profiling information and store the profiling information at corresponding locations in the memory region. The profiling information may include execution characteristics of one or more runs of the program code, such as frequencies of execution of particular instructions in the program code, values of program variables, or other information used by the compiler to perform optimizations.

The profiling system may invoke an optimizer component, such as an optimizing compiler or other optimizing tool, which may read the profiling information from the memory region and generate optimized program code in accordance with the profiling information. The optimizing component may then use the profiling information to optimize the profiled program code and/or to optimize program code subsequently generated from the same or similar source code as the profiled program code. The memory region may be, for example, a persistent memory region. Thus, gathering profiling information can be simpler and more efficient than in existing profiling systems, which use file access operations to store profiling information in files. The profiling system disclosed herein can gather profiling information from multiple concurrently-running instances of the program code, which can store and update profiling information in a shared region of memory using mutual exclusion techniques. The compiler or other profiling tool that generates the profiling instructions can generate code that gathers any desired profiling information and processes the profiling information using any desired operations. Although particular examples of profiling information may include data values such as counters that represent frequencies of execution of particular portions of program code, the profiling information is not limited to counters. The profiling information may include data structures such as hash tables that contain information used by an optimizer. In one example, the profiling information may include a hash table that contains caller count information for a particular function in the program code. The caller count information may include a count of how many times the function is called by each distinct call site in the program code, for example. The compiler or other profiling tool can therefore generate optimization-specific profiling instructions.

Each profiling instruction may correspond to a location in the memory region at which profiling information generated by the profiling information is stored. For example, each profiling instruction may be associated with a numeric identifier, and the numeric identifier may be used to determine a corresponding offset value. The profiling information generated by a profiling instruction may be stored in the memory region at an address determined by adding the profiling instruction's corresponding offset value to the address at which the memory region begins.

An optimizer component may read the profiling information from the memory region and generate optimized program code in accordance with the profiling information. The memory region may be, for example, Persistent Random Access Memory ("PRAM"), which retains its contents when electrical power is not supplied, and has performance characteristics similar to dynamic random access memory ("DRAM"). As another example, the memory region may be a memory-mapped region that corresponds to contents of a file stored on a persistent storage device such as a disk. Further, multiple running instances of the program code, e.g., in different operating system processes, may update the profiling information concurrently. Fine-grained mutual exclusion techniques may be used by profiling instructions in concurrent processes to update the profiling information efficiently.

Since the profiling information may be stored in memory that is accessible by both the program being profiled and the optimization component, there is no need to generate files containing the profiling information. Thus, the build process is simpler to manage and more efficient than in existing profiling techniques. Further, multiple runs of the program may be profiled concurrently and/or at different times, and the profiling information from each of the runs may be included in the profiling information.

The systems and methods described herein include technical improvements to a computing environment. In particular, aspects of the present disclosure may enhance the performance of a computing system by storing profiling information in memory and generating optimized program code using the profiling information stored in memory. Various aspects of the above referenced methods and systems are described in details herein below by way of examples, rather than by way of limitation.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rack-mount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include a memory 102, hardware devices 150, and a network 160.

Memory 102 may be any virtual memory, logical memory, physical memory, guest memory that is used by a virtual machine, other portion of memory, or a combination thereof for storing, organizing, or accessing data. Memory 102 may include instructions and data of components that perform operations described herein, such as compiler 104. Memory 102 may include first compiler phrase 104A, source code 108, operating system 110, first program executable 112, first program process 120, memory region 140, second compiler phase 104B, and second program code 174. First program executable 112 may be an executable file, a shared library, or other object in which program code instructions are stored. Memory region 140 may be a persistent memory region, e.g., PRAM or the like. Source code 108 may include program code instructions in a programming language such as C, C++, JAVA, JAVASCRIPT, PYTHON, or the like. Source code 108 may include one or more statements that implement an application in the programming language, for example. First program executable 112 may be generated by first compiler phrase 104A or by a linker (not shown) from object code generated by first compiler phrase 104A.

First program executable 112 may include program code instructions, profiling instructions, and a profiling region size 118. First compiler phase 104A may generate program code instructions 114, profiling instructions 116, and profiling region size 118 of first program executable 112. First compiler phase 104A may generate program code instructions 114 by compiling source code 108. First compiler phase 104A may include profiling instruction generator 106, which may generate profiling instructions 116. Profiling instructions 116 may generate profiling information 140 as described below. Profiling region size 118 may be a size of a memory region 140, and may be generated by a linker from information provided by first compiler phase 104A, such as a number of profiling information items 146 produced by profiling instructions 116 and a size of each profiling information item 146.

Operating system 110 may be, for example, Microsoft®, Windows®, Linux®, Solaris®, etc. Operating system 110 may manage memory 102, and manage execution of program code sored in memory 102, such as compiler phases 104 and first program executable 112. Operating system 110 may load first program executable 112 into memory 102 and execute first program executable 112 in first program process 120. First program process 120 may be a running instance of first program executable 112. First program process 120 may include a profiling region base address 122, which may specify an address at which memory region 140 begins. Profiling region base address 122 may be determined by operating system 110 from profiling region size 118. First program process 120 may also include profiling instructions 124, which may be copied from profiling instructions 116 (e.g., by operating system 110 when from first program executable 112 is loaded into memory 102). Profiling instructions 124 may execute in first program process 120.

Profiling instructions 124 may be added to program code instructions 114 by profiling instruction generator 106. Each profiling instruction 124 in program code instructions 114 may generate or be associated with a profiling identifier 126, and may generate a profiling information item 128. First compiler phase 104A may provide the value of the profiling identifier 126 (e.g., by incrementing a profiling identifier counter for each profiling instruction 116 added to program code instructions 114 of first program executable 112). Second compiler phase 104B may use the profiling identifier 126 to identify the profiling information item 128 associated with particular program code instructions 114, and use the profiling information item 128 to make an optimization decision related to the particular program code instructions. That is, second compiler phase 104B may map the profiling identifier 126 back to the respective instructions or instruction sequence when generating optimized program code instructions 175. Second compiler phase may retrieve the profiling identifier 126 from profiling information 142 stored in memory region 140.

Each profiling instruction may invoke a profiling information location address generator 130, which may generate an address in memory region 140 at which profiling information item 128 is to be stored. Address generator 130 may generate the address at which to store profiling information item 128 using the profiling identifier 126, e.g., by looking up the address in a lookup table that associates profiling identifiers with addresses.

Profiling information updater 132 may store profiling information item 128 in memory region 140 at an address determined by address generator 130. Profiling information updater 132 may also store profiling identifier 126 in memory region 140 in association with profiling information item 128. Each profiling identifier 126 and profiling information item 128 stored in memory region 140 is illustrated as a profiling identifier 144 and an associated profiling information item 146, respectively. Memory region 140 thus includes profiling information 140. Three example profiling identifiers 144 and associated profiling information items 146 are illustrated: profiling ID1 144A, ID2 144B, and IDN 144N, which correspond, respectively, to profiling information item A 146A, profiling information item B 146B, and profiling information item N 146. Each profiling information item 146 may include, for example, a counter value. The counter value may indicate a number of times a profiling instruction 124 associated with the same profiling identifier 144 as the profiling information item 146 has been called in a first program process 120. The counter value may be a total number of times the associated profiling instruction 124 has been called in the first program process 120, or a relative number of times the associated profiling instruction 124 has been called in the first program process. The relative number of times may be, for example, a number of times the associated profiling instruction 124 has been called since a reset of the counter value. As another example, a value may be counted for a region of program code instructions (e.g., a function), and a difference between a count at the end of the region and a count at the beginning of the region may be determined and added to a running count.

As yet another example, the information used to determine the caller count indication may be stored in a data structure, e.g., one or more hash tables, generated by the compiler, stored in a memory region, and retrieved from the memory region by a subsequent phase of the compiler and used to perform optimizations. The compiler may generate profiling instructions that create the hash table(s), and may also generate program code that reads the profiling information from the hash tables and provides the profiling information to the second optimization phase. For example, a profiling information item 146 may include a caller count indication, which may be an indication of how many callers a function can have. The caller count indication can be determined by determining a number of distinct callers in a set. In one implementation, the caller count may be approximated using techniques that efficiently determine whether particular elements are in a hash table (e.g., Bloom filters), where the hash table represents a set of distinct callers. The hash table may be implemented using HyperLogLog hashing, for example, and stored in a profiling information item 146.

Second compiler phase 104B includes profiling information reader 172, which may retrieve profiling information 142 from memory region 140. Second compiler phrase 104B also includes code optimizer 170, which may use the retrieved profiling information 142 to generate second program executable 174 from source code 106. Second program executable 174 may include optimized program code instructions 175 generated by code optimizer 170 using profiling information 142. Code optimizer 170 and optimized program code instructions 175 are described below, e.g., with respect to FIGS. 3A-3C.

Memory region 140 may include multiple memory regions, which may be referred to herein as sub-regions. Thus, each sub-region memory region 140 may be used to store the information about a particular first program executable 112, which may correspond to a particular executable version of a program. For example, a unique identifier may be associated with the first program executable's contents (e.g., a hash value determined from the file's contents). The unique identifier may also be associated with a particular sub-region of memory region 140, so updates to profiling information 142 stored in the sub-region of region 140 may be made only by the particular first program executable 112.

Hardware devices 150 may provide hardware resources and functionality for performing computing tasks. Hardware devices 150 may include one or more physical storage devices 152, one or more physical processing devices 154, other computing devices, or a combination thereof. One or more of hardware devices 150 may be split up into multiple separate devices or consolidated into one or more hardware devices. Some of the hardware device shown may be absent from hardware devices 150 and may instead be partially or completely emulated by executable code.

Physical storage devices 152 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 152 may be physical memory and may include volatile memory devices (e.g., random access memory (RAM)), non-volatile memory devices (i.e., persistent RAM (PRAM), which may be, e.g., flash memory, NVRAM, Phase Change Memory (PCM), 3D XPoint, or the like), and/or other types of memory devices. In another example, physical storage devices 152 may include one or more mass storage devices, such as hard drives, solid state drives (SSD)), other data storage devices, or a combination thereof. In a further example, physical storage devices 152 may include a combination of one or more memory devices, one or more mass storage devices, other data storage devices, or a combination thereof, which may or may not be arranged in a cache hierarchy with multiple levels.

Physical processing devices 154 may include one or more processors that are capable of executing the computing tasks. Physical processing devices 154 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 154 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 160 may be a public network (e.g., the internet), a private network (e.g., a local area network (LAN), a wide area network (WAN)), or a combination thereof. In one example, network 160 may include a wired or a wireless infrastructure, which may be provided by one or more wireless communications systems, such as a wireless fidelity (WiFi) hotspot connected with the network 160 and/or a wireless carrier system that may be implemented using various data processing equipment, communication towers, etc.

Figure 2:
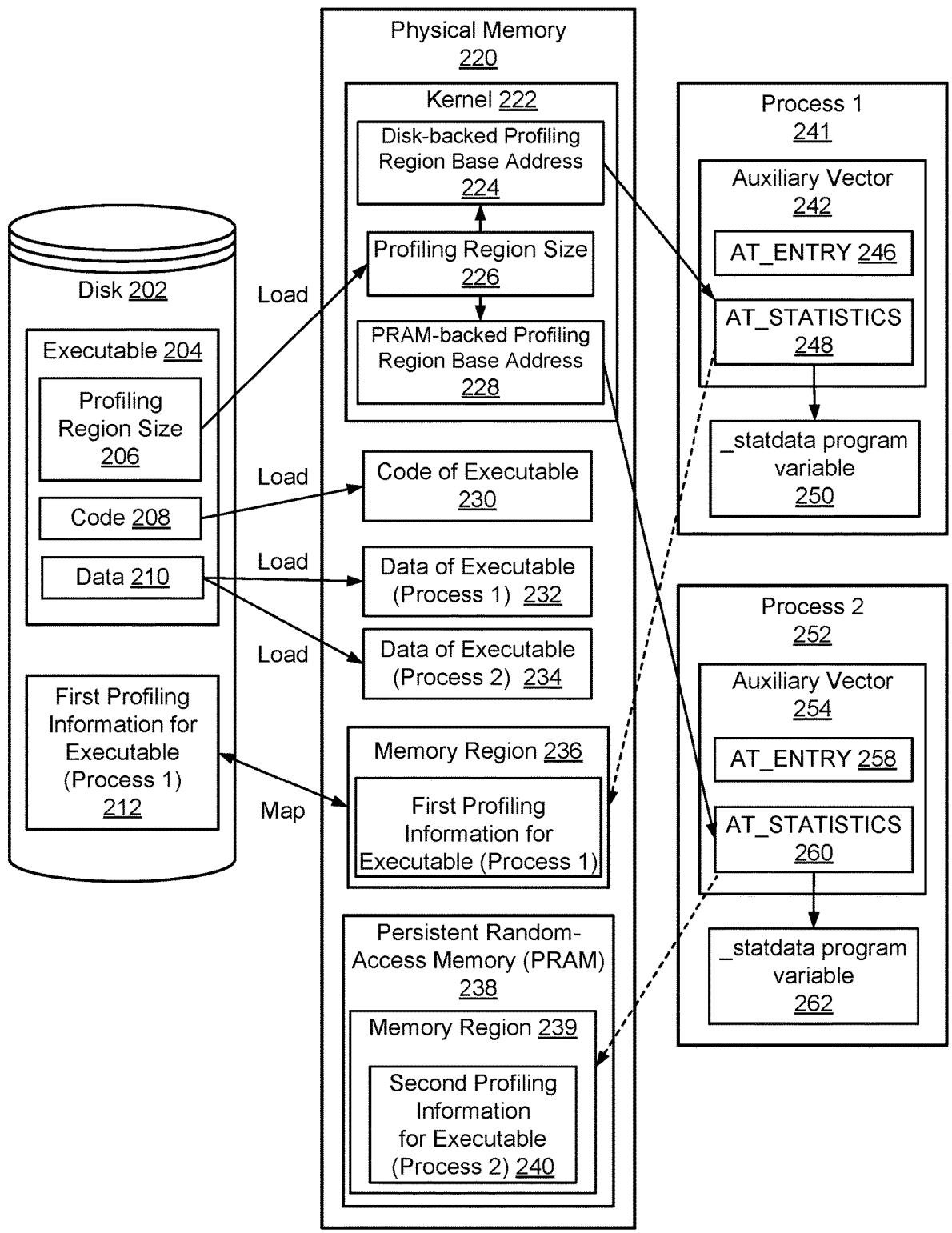
FIG. 2 depicts a diagram illustrating allocation of persistent memory regions in which profiling information may be stored, in accordance with one or more aspects of the present disclosure.

FIG. 2 depicts a diagram illustrating allocation of persistent memory regions in which profiling information may be stored, in accordance with one or more aspects of the present disclosure. An executable 204, which may correspond to first program executable 112, is stored on disk 202. Executable 204 includes a profiling region size 206, which may correspond to profiling region size 118, code 208, which may correspond to program code instructions 114 and profiling instructions 116, and data 210, which may be generated by first compiler phrase 104A from source code 108 for use by code 208. Data from disk 202 may be loaded into physical memory 220, e.g., by instructions of kernel 222. Kernel 222 may be a component of operating system 110.

Two example processes are shown in FIG. 2. A first example process, "Process 1" 241, accesses profiling information stored on disk via a memory-mapped memory region 236. A second example process, "Process 2" 252, access profiling information stored in a memory region 239 of persistent random-access memory (PRAM) 238. The processes 241, 252 may be created by kernel 222.

Kernel 222 may generate profiling region base addresses for profiling information as described with respect to profiling region base address 122 of FIG. 1. Kernel 222 may read profiling region size 226 from executable 204, e.g., from profiling region size 206 of executable 204. Kernel 222 may generate a disk-backed profiling region base address 224 for Process 1 241 by identifying a region in physical memory 220 of a size that corresponds to profiling region size 226. Similarly, kernel 222 may generate a PRAM-backed profiling region base address 228 for Process 2 252 by identifying a region in PRAM 238 of a size that corresponds to profiling region size 226.

Kernel 222 may load executable code 230 from the code 208 stored on disk 202. Process 1 241 and Process 2 252 may share the same executable code 230. Kernel 222 may create a separate data region in physical memory 220 for each process. Thus, kernel 222 may load data of the executable (for Process 1) 232 from data 210, and also load data of the executable (for Process 2) 234 from data 210.

First profiling information 212 for executable 204 is stored on disk 202. First profiling information 212 is used by Process 1 241. Process 1 241 is similar to first program process 120, but stores profiling information 236 in a region of physical memory 220 that is mapped to a file on disk 202. The file on disk 202 contains first profiling information 212. Kernel 220 creates auxiliary vector 242 in memory for Process 1 241. Auxiliary vector 242 is shown in Process 1 241, and include values labeled AT_ENTRY 246, which is an address of an instruction at which to begin execution of Process 1 241, and AT_STATISTICS 248, which is an address of memory region 236. Kernel 222 may be extended to generate the value of AT_STATISTICS and include an entry in auxiliary vector 242 for AT_STATISTICS and the corresponding value (which is the address of the memory region 236). Memory region 236 may be generated by, for example, using a memory-mapping operating system call such as "mmap" or the like to establish a mapping between contents of first profiling information 212 stored on disk 202 and memory region 236. When this mapping is established, changes to the memory region 236 are made to the corresponding data on disk 202 (e.g., by the operating system), and vice-versa. Kernel 222 or other operating system component may be extended to store the address of memory region 236 in the AT_STATISTICS entry of auxiliary vector 242. Alternatively, user-level program code may perform the memory-mapping system call and provide the address of memory region 236 to process 1 241. Kernel 222 or other operating system component may also provide a program variable named _statdata 250 that specifies the address of memory region 236 (e.g., has the same value as AT_STATISTICS 248). The auxiliary vector 242 may be data a structure in which information may be passed from kernel 222 to process 1 241. The auxiliary vector 242 may correspond to an Executable and Linkable Format (ELF) auxiliary vector, for example. The auxiliary vector 242 may be generated by kernel 222 to pass information to processes. The value of AT_STATISTICS may be read from or determined from a memory address specified in an ELF file, for example. If profiling is not enabled for executable 204, the value of _statdata 250 is 0 or null.

Second profiling information 240 for executable 204 is stored in a memory region 239 of PRAM 238. Second profiling information 240 is used by Process 2 252. Process 2 252 is similar to first program process 120. Kernel 220 creates auxiliary vector 254 in memory for Process 2 252. Auxiliary vector 254 is shown in Process 2 252, and include values labeled AT_ENTRY 258, which is an address of an instruction at which to begin execution of Process 2 252, and AT_STATISTICS 260, which is an address of memory region 239 in PRAM 238. Kernel 222 or other operating system component may be extended to determine the address of memory region 239 from PRAM-backed profiling region base address 228 and store the determined address in the AT_STATISTICS entry of auxiliary vector 254. Kernel 222 or other operating system component may also provide a program variable named _statdata 262 that specifies the address of memory region 239 (e.g., has the same value as AT_STATISTICS 260). If profiling is not enabled for executable 204, the value of _statdata 262 is 0 or null.

An example implementation of profiling information updater 132 as a function named "profile" is as follows.

```
profile(ID) {
  if (_statdata != 0) {
    index = convert_to_index(ID)
    atomic_increment(_statdata[index])
  }
}
```

The profile function may be invoked at each point in program code instructions where profiling information is desired. Thus, profiling instructions 116 may include calls to the profile function, e.g., "profile(ID1)" to generate profiling information for a profiling identifier 126 having the value ID1 at a particular point in program code instructions 114. Although the profiling information updater 132 is shown as a function having a particular interface (e.g., having a profiling identifier parameter), the profiling information updater 132 may have any suitable interface. For example, a value of a program variable may be passed to the profile function in addition to the profiling identifier. The value of the program variable may be stored in the corresponding profiling information item. As another example, the profiling function's parameters may include a data structure that represents a profiling information item. The profiling information item parameter passed to the profiling function may include any suitable information to be gathered from the program code and stored in profiling information items 146, e.g., a value further characterizing the profiling information item, such as a profiling detail or granularity level, a value of a program variable, a value generated by the first compiler phase 104A to be provided to the second compiler phase 104B, and so on. Further, there may be multiple different profiling functions having different interfaces in the same first program executable 112.

The compiler 104 may determine the interface of the profiling function, since the compiler 104 generates the profiling instructions 124. Thus, for example, the first compiler phase 104A may determine which information is to be passed to profiling instructions 124 and stored in profiling information items 146 and passed to the second compiler phase 104B. The first compiler phase 104A may provide compiler-specific information, e.g., internal compiler data structures or optimization information to the profiling instructions 124 and perform any suitable processing of the compiler-specific information in the profiling instructions 124, which may generate additional compiler-specific information. The compiler-specific information may be stored in profiling information items 146 and provided to the second compiler phase 104B.

The profile function receives an argument named "ID" that corresponds to profiling identifier 126. The profiling function determines whether the _statdata value (e.g., _statdata 250 or 262) is 0. The _statdata variable may contain the base address of a persistent memory region, such as memory region 236 or 239. Alternatively or additionally, _statdata may reference an array of profile information items 128. The _statdata variable may be set by the kernel of operating system 110, e.g., based on a profiling region size 118 specified in the first program executable 112. Alternatively, the _statdata variable may be set by a user-level runtime environment of operating system 110, e.g., prior to executing the program code instructions 114 and profiling instructions 116 of the executable 112. Profiling may be disabled by setting the _statdata variable to 0, e.g., from configuration information or a parameter provided to the first program executable 112. The kernel, the program code instructions 114, or both may set the value of _statdata to 0 at any suitable time prior to or during execution of the first program executable 112 to disable profiling or to an address of a persistent memory region 140 to enable profiling.

If _statdata is 0, then profiling is not enabled, so the profile function does not generate profiling information. If _statdata is not 0, then the profile function generates an array index from the ID value by invoking a function named "convert to index". The profile function may use the array index to access information items stored in memory that starts at the address specified by _statdata. The array index thus corresponds to an offset from the address specified by _statdata according to the following relation: the offset may be calculated as a number of bytes by multiplying the array index by the size of an array element in bytes. For example, if ID values are consecutive, the array index may be the same value as the ID value. The offset of the element having an index specified by the ID value may be determined by multiplying the ID value by the size of an array element. Alternatively, the array index may be determined using a lookup table that maps ID values to array indexes. The array index corresponds to the address at which the information item being generated is to be stored. The array index may also be understood as an offset from _statdata. Thus, the memory location of the information item being generated may alternatively be determined by adding an offset to the address specified by _statdata. The offset may be determined by multiplying the size of each information item by the index. In another example, the compiler may generate profiling instructions that store data structures such as hash tables, counters, large sums, or other data structures that represent information used by an optimization phase of the compiler. The offset of each profiling information item may be determined by a function that maps ID values to offset values. Alternatively or additionally, the ID may be a function name, and a string value that corresponds to the function name may be mapped to an offset value that identifies the memory location at which the information item corresponding to the ID is stored.

The memory location of the information item being generated is specified by _statdata[index]. In this example, the information item includes a counter that is incremented by invocation of the profile function. Since multiple different processes may invoke the profile function concurrently, the counter is incremented using an atomic increment function that provides a mutually exclusive increment operation, which prevents multiple processes from concurrently updating the counter. Thus, the profile function invokes atomic_increment on _statdata[index], which increments the information item stored at the location specified by _statdata [index].

Although an information item 146 is described as containing a single counter value in the example above, an information item 146 may contain multiple counter values or other information. For example, each counter value in an information item 146 may be associated with a corresponding condition and incremented in response to the corresponding condition being satisfied each time the profiling instruction is executed. An information item may be associated with a program variable. A first counter may be incremented if the variable is less than 1, a second counter may be incremented if the variable is less than 10, and a third value may be incremented if the variable is less than 100. In this way, optimization decisions may be made using distributions of values of a variable.

Further, although each profiling information item 146 may be of the same size, as in the case of each array element referred to above as _statdata[index], different information items 146 may have different sizes. For example, if a string value is stored in an information item, then different information items in which strings of different lengths are stored may have different sizes. The compiler may determine the size of each information item. The compiler may determine the total size of the persistent memory region in which the information items 146 are to be stored by computing a sum of the sizes of the information items. An information item may be generated for each unique identifier passed to a profile( ) function invocation, for example. The size of the persistent memory region may be determined as a sum of the sizes of the information items, wherein each information item used in the sum corresponds to a different identifier value (e.g., ID1, ID2, and ID3 in the case of three identifier values used in invocations profile(ID1), profile(ID2), and profile(ID3)). The compiler may compute the offset to each information item using a sum of the sizes of the preceding information items. That is, the address of a particular profiling information item 146 may be determined as a sum of the sizes of the profiling information items 146 for each profiling point prior to the profiling point for which the particular profiling information item 146 is generated. A profiling point may correspond to an invocation of a profile( ) function in program code instructions 114, for example.

Figure 3A:
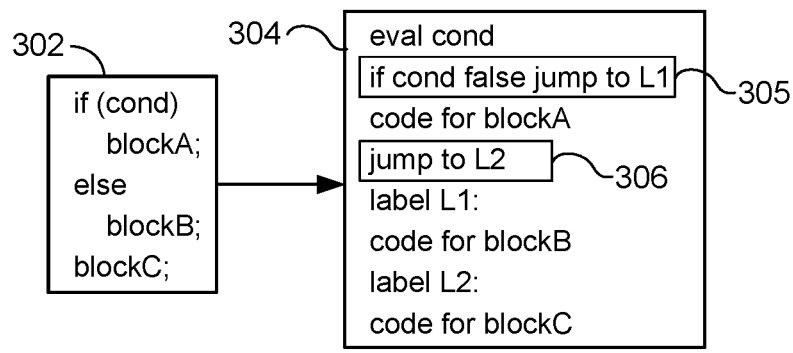
FIG. 3A depicts example source code and example generated program code that includes a branching optimization decision, in accordance with one or more aspects of the present disclosure.

FIG. 3A depicts example source code 302 and example generated program code 304 that includes a branching optimization decision, in accordance with one or more aspects of the present disclosure. The source code 302 includes an "if" statement that, when executed by a processor, evaluates a condition. If the condition is true, then the processor executes a first block of one or more statements ("blockA"). If the condition is false, then the processor executes a second block of one or more statements ("blockB"). Subsequent to the "if" statement, the processor executes a third block of one or more statements ("blockC"). That is, the third block is separate from the "if" statement and is executed regardless of the condition. A compiler, such as the first compiler phase 104A of FIG. 1, may translate the source code 302 to program code instructions 304. The program code instructions 304, when executed by a processor, perform the following operations: (1) evaluate a condition; (2) if the condition is false, jump to label L1 (instruction 305); (3) execute program code instructions that the compiler generates for blockA (4); jump to label L2; (5) at label L1, execute program code instructions that the compiler generates for blockB; (6) at label L2, execute program code instructions that the compiler generates for blockC.

The conditional branch statement 305 ("if cond false jump to L1") is followed by an invocation of the program code for blockA, which is executed if the condition is true. If the condition is false, a jump to label L1 is performed, and the program code for block B is executed. A jump instruction may increase execution time, including both the time to execute the jump instruction and the time to refill the processor's instruction pipeline after the jump instruction is executed. The pipeline may need to be refilled because the processor may not be able to predict which instructions will subsequently be executed after the jump instruction. Thus, for example, the processor may not be able to begin fetching and decoding those subsequent instructions prior to executing the jump instruction. As such, possible optimizations of the program code 304 involve avoiding execution of the jump instruction 305.

The program code 304 executes the code for blockA without executing the "jump to L1" instruction if the condition is true. However, if the condition is false, the program code 304 performs the "jump to L1" instruction 305 and executes the code for blockB. If either result of evaluating the condition (e.g., true or false) is significantly more probable, then a compiler may generate optimized program code that is expected to be more efficient for the more probable result, as described below with respect to FIG. 3B.

Figure 3B:
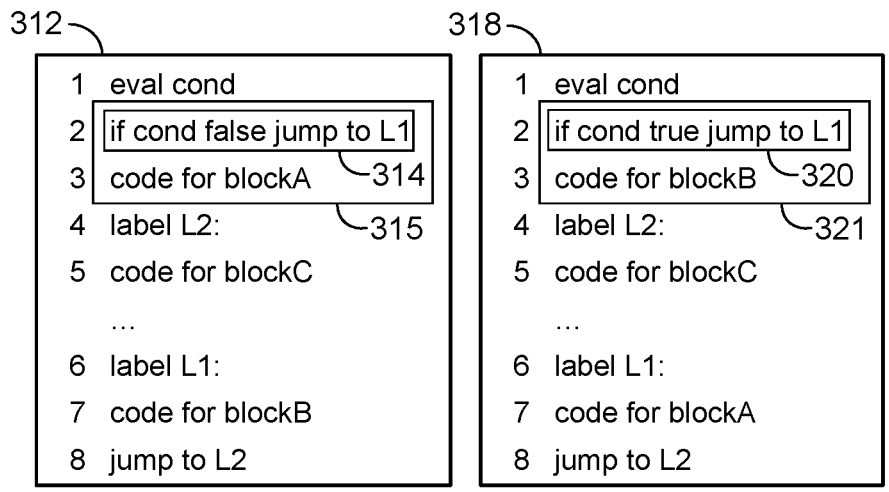
FIG. 3B depicts two alternative optimized program code sequences that illustrate branching optimizations, in accordance with one or more aspects of the present disclosure.

FIG. 3B depicts two alternative optimized program code sequences 312, 318 that illustrate branching optimizations, in accordance with one or more aspects of the present disclosure. In the example described above with respect to FIG. 3A, an optimizer may make a decision as to whether to generate program code 312, which, similarly to program code 304, executes the code for blockA without executing the "jump to L1" portion of instruction 314 if the condition is true, or to generate program code 318, which executes the code for blockB without executing the "jump to L1" portion of instruction 320 if the condition is false.

Optimizable instructions 312 may be more efficient than optimized instructions 318 when the code for blockA is more likely to be executed, which may be the case when the condition is more likely to be false. In that case, case optimization of optimizable instructions 312 is not needed.

Optimized instructions 318 may be more efficient than optimizable instructions 312 when the code for blockB is more likely to be executed, which may be the case when the condition is more likely to be true. In that case, optimizable instructions 312 may be replaced with optimized instructions 318. Instructions 312 are referred to herein as "optimizable instructions" and instructions 318 are referred to as "optimized" instructions for explanatory purposes. The terms "optimizable" and "optimized" are relative to an optimization for the expected case of instruction executions in which the condition is more likely to be false. In other examples, e.g., if the condition is more likely to be true, instructions 312 may be referred to as optimized, and instructions 318 may be referred to as optimizable.

An optimizer, such as an optimizing compiler, may decide whether to generate optimizable program code 312 or optimized program code 318. This decision is referred to herein as an "optimization decision" and may be made using profiling information that indicates how frequently the code for blockA is executed (e.g., relative to how frequently the code for blockB is executed, or to how many times the condition is evaluated). If the condition is more likely to be true, then an optimizer may generate program code 312, which is more efficient when the condition is true. Otherwise, if the condition is more likely to be false, then the optimizer may generate the program code 318, which is more efficient when the condition is true.

Thus, an optimization decision may be a determination as to whether to generate one or more optimizable program code instructions 312 or one or more optimized program code instructions 318 that correspond to a portion of the source code. As an example, an optimization decision is made when generating instructions for the "if" statement of source code 302 as to whether to generate optimizable instructions 315 or optimized instructions 318. Optimizable instructions 315 are "if cond false jump to L1" and "code for blockA". Optimizable instructions 315 may be associated with execution characteristics, such as a frequency of execution of one or more of the optimizable instructions 315. The frequency of execution of one or more of the optimizable instructions 315 may correspond to a set of inputs in which the code for blockA is more likely to be executed than the code for blockB (e.g. inputs for which the condition is more likely to be true). If the frequency of execution of the instruction "code for blockA" is less than a threshold value, e.g., less than 50%, then optimized instructions 321 are expected to be more efficient than optimizable instructions 315, and optimizable instructions 321 should be generated for source code 302. Since the execution characteristics, such as the frequency of execution of instructions, are not ordinarily available or determinable from source code 302, profiling information that corresponds to the execution characteristics may be gathered by executing program code that includes the instructions 312 and profiling instructions, as described below with respect to FIG. 3C.

Figure 3C:
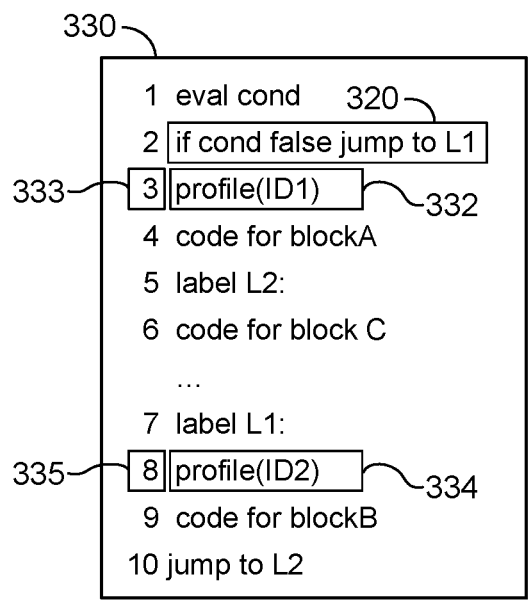
FIG. 3C depicts example program code that includes profiling instructions related to a branching optimization decision, in accordance with one or more aspects of the present disclosure.

FIG. 3C depicts example program code 330 that includes profiling instructions 332, 334 related to a branching optimization decision, in accordance with one or more aspects of the present disclosure. A first compiler phase 104A (or other component that includes profiling instruction generator 106) may generate the program code 330. Since the optimization decision described above depends on execution characteristics such as a frequency of execution of the "code for block A" of instructions 312, profiling instructions 332, 334 that gather profiling information may be added to the program code 312. The profiling information may correspond to the execution characteristics used to make the optimization decision.

The profiling information may include statistics indicating how many times the condition evaluated to true and how many times the condition evaluated to false in one or more executions of program code 312. For example, to optimize the program code 312, one or more optimizable instructions may be identified. The optimizable instructions may be associated with an execution characteristic that determines a result of an optimization decision. In this example, optimizable instructions associated with such an execution characteristic include the code for blockA at line 3. A profiling instruction location, at which to add a profiling instruction, may be identified in the program code 312. The profiling instruction location may be associated with an optimizable instruction that is associated with the execution characteristic. The optimizable instruction is the code for blockA in this example, so the profiling instruction location is associated with the code for block A at line 3. In this example, the profiling instruction location is adjacent to the optimizable instruction "code for blockA", and is at line 3 of the instructions 330.

The profiling instruction generator 106 may add a first profiling instruction 332 ("profile(ID1)"), which includes a first profiling identifier ("ID1"), to the program code 330 at a profiling location 333 that corresponds to line 3. The first profiling instruction 332 generates profiling information that includes a count of how many times the code for blockA (located at line 4) is reached, which corresponds to how many times the condition is true in the execution(s) of program code 330. A second profiling instruction may be added to count the total number of times the "if cond" instruction is reached, e.g., by adding a "profile(ID0)" instruction between the "eval cond" instruction and the "if cond false jump to L1" instruction 314. In that example, the probability that the condition is true may be approximated by the value of the ID1 counter divided by the value of the ID0 counter. As another example, a second profiling instruction 334 may be added to count the number of times the condition evaluates to false. The second profiling instruction 334 may be "profile(ID2)" and may be added to the program code 330 at a profiling location 335 that corresponds to line 8. The second profiling instruction 334 may count the number of times the code for blockB is executed. Profiling locations may be specified as line numbers or other information that identifies a location in instructions 330. Thus, on other examples, profiling locations may be specified as character locations in instructions 330, or relative to particular instructions in instructions 330.

The probability that the condition at line 2 of instructions 330 is true may be approximated by the value of the ID1 counter divided by the sum of the ID1 and ID2 counters. If the probability that the condition is true is greater than or equal to a threshold value such as 0.5 (or other suitable threshold value, e.g., 0.6, 0.4, etc.), then the optimization decision may be made in favor of generating the optimizable program code 312 that is more efficient if the condition is true. Otherwise, if the probability that the condition is true is less than 0.5 (or other suitable threshold value, e.g., 0.6, 0.4, etc.), then the optimization decision may be made in favor of generating the optimized program code 318 that is more efficient if the condition is false. As such, the optimization decision may be a determination as to whether to generate one or more first optimized program code instructions 330 for source code 302.

Other profiling information may be gathered and used to make optimization decisions. For example, if source code evaluates a condition that may have three different outcomes, e.g., three different classifications or categories, then the number of times the condition has each of the three outcomes may be stored as profiling information. A profile function may increment one of three different counters that corresponds to one of three different ranges as follows:

```
profile(value, ID) {
    if (__statdata != 0) {
        index = convert_to_index(ID)
        if (value > 0 and value < 10)
            atomic_increment(__statdata[index].counter1)
        else if (value >= 10 and value < 100)
            atomic_increment(__statdata[index].counter2)
        else
            atomic_increment(__statdata[index].counter3)
    }
}
```

This profile function stores the number of times a specified value is between 0 and 10 in a first counter associated with a specified profiling identifier ID, the number of times a specified value is between 10 and 100 in a second counter associated with the profiling identifier ID, and the number of times the specified value is greater than or equal to 100 in a third counter associated with the profiling identifier ID. The profiling information may be used to determine for which of the three cases to optimize program code.

FIG. 4A depicts example source code 402 and example generated program code 404 that includes a function inlining optimization decision, in accordance with one or more aspects of the present disclosure. The source code 402 includes a function call "f(a)" that, when executed by a processor with a specified parameter value a, causes the processor to execute a statements specified in the function definition that begins with "f(p)". The statements in the function definition evaluate the condition "p<10". If the condition "p<10" is true, then the processor executes a first block of one or more statements ("blockA"). If the condition "p<10" is false, then the processor executes a second block of one or more statements ("blockB"). Subsequent to the "if" statement, the processor executes a third block of one or more statements ("blockC"). A compiler, such as the first compiler phase 104A of FIG. 1, may translate the source code 402 to program code instructions 404. The program code instructions 404, when executed by a processor, perform the following operations: (1) get a parameter value from the memory location a; (2) call function f (statement 406), which causes a jump to the statements 408. The statements 408 perform the following operations: (1) test whether the parameter is <10; (2) if the test is false, jump to label L1; (3) execute program code instructions that the compiler generates for blockA (4); jump to label L2; (5) at label L1, execute program code instructions that the compiler generates for blockB; (6) at label L2, execute program code instructions that the compiler generates for blockC. The "call f" instruction 406 may increase execution time because additional operations may be needed to transfer the parameter value "a" to the function's instructions 408 when the "call f" instruction is executed. Further, the "call f" instruction 406 has similarities to a jump instruction (or the like) to the function's instructions 408, and thus may increase execution time for reasons similar to those described above with reference to the conditional branch statement 305 of FIG. 3A (e.g., causing delay while the processor refills the instruction pipeline). If information about the value of the parameter value "a" is known, and the information indicates that the value of "a" is known to satisfy the condition of the "if" statement (e.g., a <10), then an optimizer may omit the generated instructions that correspond to the "if" statement. For example, the compiler may omit the "test parameter <10" and "if test false jump to L1" instructions in the function's instructions 408 if the value of "a" at the "call f" instruction 406 is known to be less than 10. FIG. 4B depicts example program code 410 that includes a function inlining optimization, in accordance with one or more aspects of the present disclosure. In the example described above with respect to FIG. 4A, an optimizer may make a decision as to whether to generate optimized instructions 410, in which the function "f" is inlined and replace optimizable instructions 404 with the instructions 410. That is, in optimized instructions 410, the statements 416 in the definition of function "f" are duplicated at the site of the "call f" instruction 406, thereby creating inline instructions 412, 414. The "call f" instruction 406 is not present in optimized instructions 410. Further, the value of "a" is used in the inline statement 412 ("test a <10") in optimized program code 410 instead of the value of the function parameter.

Thus, the inlining optimization that produces optimized instructions 410 may reduce execution time because of the removal of the function call overhead. However the inlining optimization may also result in increased size of the optimized instructions 410 relative to the optimizable instructions 404. The increased size may reduce execution time because of increased memory usage. Thus, the amount by which the inlining optimization reduces (or increases) execution time may depend on details of the instructions 404, 410 and the processor's instruction cache. The inlining optimization may reduce execution time if the function "f" is called frequently, for example.

An optimizer 170, e.g., in the second compiler phase 104B of FIG. 1, may decide whether to perform the inlining optimization using profiling information that indicates how frequently the "call f" instruction 406 is executed. Thus, the optimization decision may depend on execution characteristics of the instructions 404 or 410. If the "call f" instruction 406 is executed more than a threshold number of times, then an optimizer may generate instructions 410, which are expected to be more efficient than instructions 404 when the function is called more than the threshold number of times. Otherwise, if the "call f" instruction 406 is executed fewer than a threshold number of times, then the optimizer may generate optimizable program code 404, which is expected to be more efficient when the function is called fewer times. Profiling information that corresponds to these execution characteristics may be gathered by executing program code that includes the instructions 404 and profiling instructions, as described below with respect to FIG. 4C.

FIG. 4C depicts example program 402 code that includes profiling instructions related to a function inlining optimization decision, in accordance with one or more aspects of the present disclosure. A first compiler phase 104A (or other component that includes profiling instruction generator 106) may generate the program code 420. Since the inlining optimization decision described above depends on execution characteristics such as a frequency of execution of the "code for block A" of instructions 412, profiling instructions 432, 434 that gather profiling information may be added to the program code 412. The profiling information may correspond to the execution characteristics used to make the optimization decision.

The profiling information may include statistics indicating how many times the function "f" is called. For example, to optimize the program code 412, one or more optimizable instructions may be identified. The optimizable instructions may be associated with an execution characteristic that determines a result of an optimization decision. In this example, optimizable instructions associated with such an execution characteristic include the "get parameter from a" instruction and the "call f" instruction 406 of optimizable instructions 404. A profiling instruction location, at which to add a profiling instruction, may be identified in the program code 404. The profiling instruction location may be associated with an optimizable instruction that is associated with the execution characteristic. The optimizable instruction is the "get parameter from a" instruction in this example, so a profiling instruction location is associated with the "get parameter from a" at the first line of the instruction 430. In this example, the profiling instruction location is adjacent to the optimizable instruction "get parameter from a", and is at line 1 of the instructions 430. Alternatively, the optimizable instruction used to determine the profiling instruction location may be the "call f" instruction, in which case the profiling instruction location may be adjacent to the "call f" instruction, e.g., at line 3 of the instructions 430.

The profiling instruction generator 106 may add a first profiling instruction 432 ("profile(ID1)"), which includes a first profiling identifier ("ID1"), to the program code 430 at a profiling location that corresponds to line 1. The first profiling instruction 432 generates profiling information that includes a count of how many times the "get parameter from a" instruction is reached, which corresponds to how many times the function "f" is called in executions of instructions 430. In addition to ID1 additional parameters may be passed to the profile( ) function. For example, the value of "a" may be passed (e.g., "profile(ID1, a)") and the profiling instruction may generate a frequency analysis or histogram using the value of a passed to each invocation of the profile( ) function. Furthermore, the address of the caller, which may be identified by the address of the instruction after the 'call' instruction, may be passed to the profile( ) function. The profile function may record the address of the caller, which may be used (e.g., by the profiling function or an optimization phase of the compiler) to determine how many distinct callers (e.g., call sites) in the program code have invoked the function. The compiler may then perform optimization using the number of distinct callers, such as determining whether to generate inline program code instructions instead of a function call.

Further, second and third profiling instructions 434, 436 may be added to count the total number of times the code for blockA is executed and the code for blockB is executed, respectively. The second and third profiling instructions are similar to the profiling instructions described above with respect to FIG. 3C.

The number of times the function "f" is called may be determined from value of the ID1. If the number of times the function is called from a particular call site is greater than or equal to a threshold value such as 1000 (or other suitable threshold value, e.g., 10000, etc.), then, depending on the number of call sites, the optimization decision may be made in favor of generating the optimized program code 430 that is more efficient when the function "f" is called many times. Otherwise, if the number of times is less than the threshold value, then the optimization decision may be made in favor of generating the optimizable program code 404 that is more efficient if the function "f" is not called many times. As such, the optimization decision may be a determination as to whether to generate one or more first optimized program code instructions 430 for source code 402.

Figure 5A:
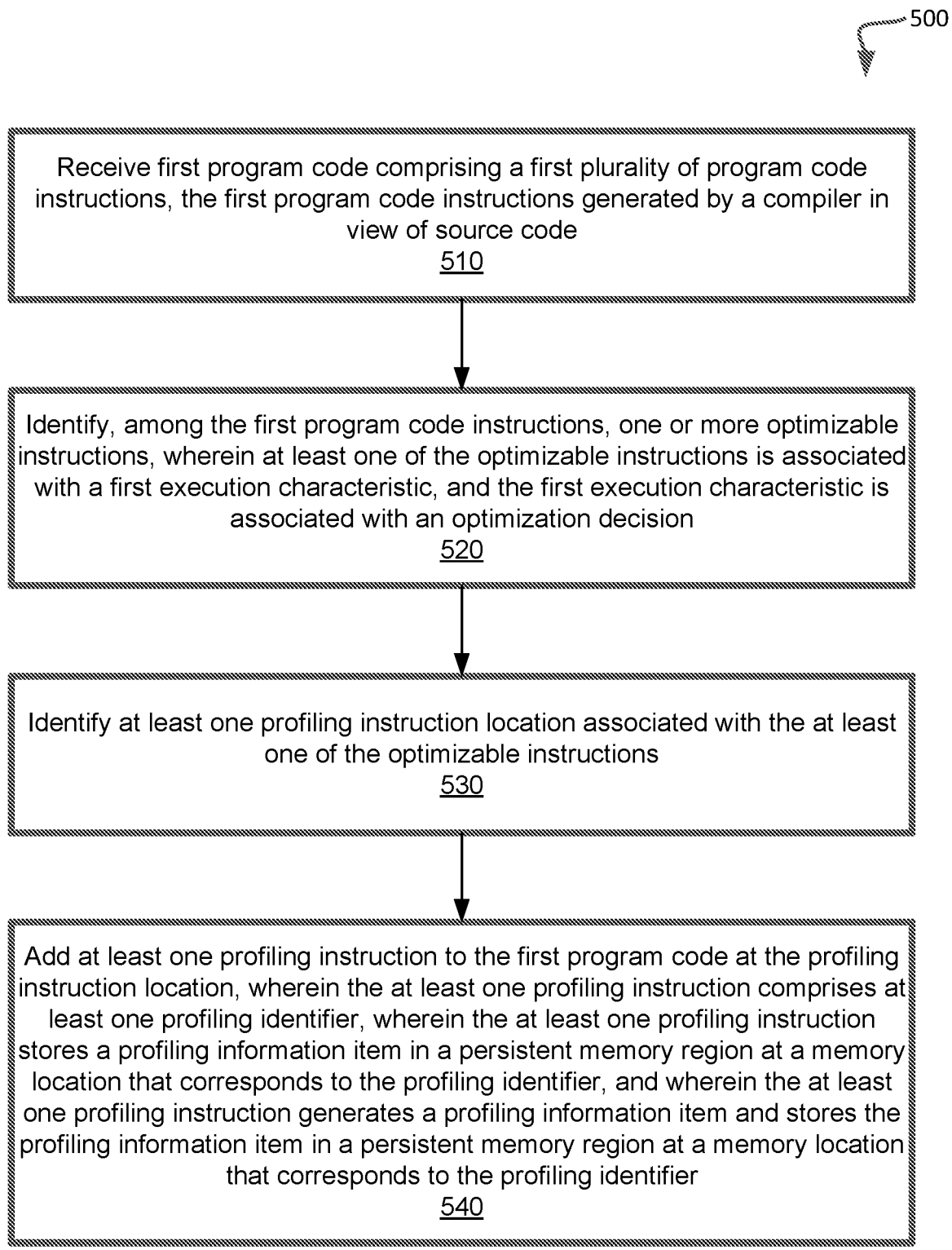
FIG. 5A depicts a flow diagram of an example method for adding profiling instructions that store profiling information in a persistent memory region to program code, in accordance with one or more aspects of the present disclosure.

FIG. 5A depicts a flow diagram of an example method 500 for adding profiling instructions that store profiling information in a persistent memory region to program code, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a computer system 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may begin at operation 510. At operation 510, a processing device may receive first program code comprising a first plurality of program code instructions, the first program code instructions generated by a compiler in view of source code. At operation 520, the processing device may identify, among the first program code instructions, one or more optimizable instructions, wherein at least one of the optimizable instructions is associated with a first execution characteristic, and the first execution characteristic is associated with an optimization decision. The first execution characteristic of the at least one of the optimizable instructions may be a frequency of execution of the one or more optimizable instructions, for example.

To determine a result of the optimization decision, the processing device may determine, in accordance with the first execution characteristic, whether to generate one or more optimized instructions that replace the one or more optimizable instructions. The least one of the optimized instructions may be associated with a second execution characteristic that is different from the first execution characteristic of the at least one of the optimizable instructions.

At operation 530, the processing device may identify at least one profiling instruction location associated with the at least one of the optimizable instructions. The processing device may identify the profiling instruction location among the first program code instructions, for example. Execution of the one or more optimized instructions uses less processor time for a particular input than execution of the one or more optimizable instructions for the particular input, and the optimized instructions may include fewer instructions than the optimizable instructions.

At operation 540, the processing device may add at least one profiling instruction to the first program code at the profiling instruction location, wherein the at least one profiling instruction comprises at least one profiling identifier, wherein the at least one profiling instruction stores a profiling information item in a persistent memory region at a memory location that corresponds to the profiling identifier, and wherein the at least one profiling instruction generates a profiling information item and stores the profiling information item in a persistent memory region at a memory location that corresponds to the profiling identifier. Responsive to completing the operations described herein above with references to operation 540, the method 500 may terminate.

FIG. 5B depicts a flow diagram of an example method 501 for generating optimized program code using profiling information stored in a persistent memory region, in accordance with one or more aspects of the present disclosure. Method 501 and each of its individual functions, routines, subroutines, or operations may be performed by one or more processors of the computer device executing the method. In certain implementations, method 501 may be performed by a single processing thread. Alternatively, method 501 may be performed by two or more processing threads, each thread executing one or more individual functions, routines, subroutines, or operations of the method. In an illustrative example, the processing threads implementing method 501 may be synchronized (e.g., using semaphores, critical sections, and/or other thread synchronization mechanisms). Alternatively, the processes implementing method 501 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 501 may be performed by a computer system 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 501 may begin at operation 550. At operation 550, a processing device may execute first program code that includes at least one profiling instruction that generates a profiling information item and stores the profiling information item in a persistent memory region at a memory location that corresponds to a profiling identifier associated with the profiling instruction. At operation 560, the processing device may generate, by a compiler, second program code comprising a second plurality of program code instructions in view of source code associated with the first program code. To perform operation 560, the processing device may execute operations 570 and 580.

At operation 570, the processing device may determine whether to generate one or more optimized instructions in view of the profiling information item stored in the persistent memory region at the memory location that corresponds to the profiling identifier. To determine whether to generate the optimized instructions, the processing device may determine whether the profiling information item satisfies a threshold condition. For example, if the profiling information item includes a counter value, the processing device may determine that the profiling information item satisfies then threshold condition in response to the counter value being greater than a threshold, e.g., greater than a threshold number of executions. Responsive to determining that the optimized instructions are not to be generated, the processing device may generate one or more alternative program code instructions from the source code, wherein the alternative program code instructions have one or more different execution characteristics than the optimized instructions. The alternative program instructions may be optimizable program code instructions, for example.

At operation 580, the processing device may, responsive to determining that the optimized instructions are to be generated, generate the optimized instructions, wherein the second plurality of program code instructions includes the optimized instructions. Responsive to completing the operations described herein above with references to operation 580, the method 501 may terminate.

Figure 6:
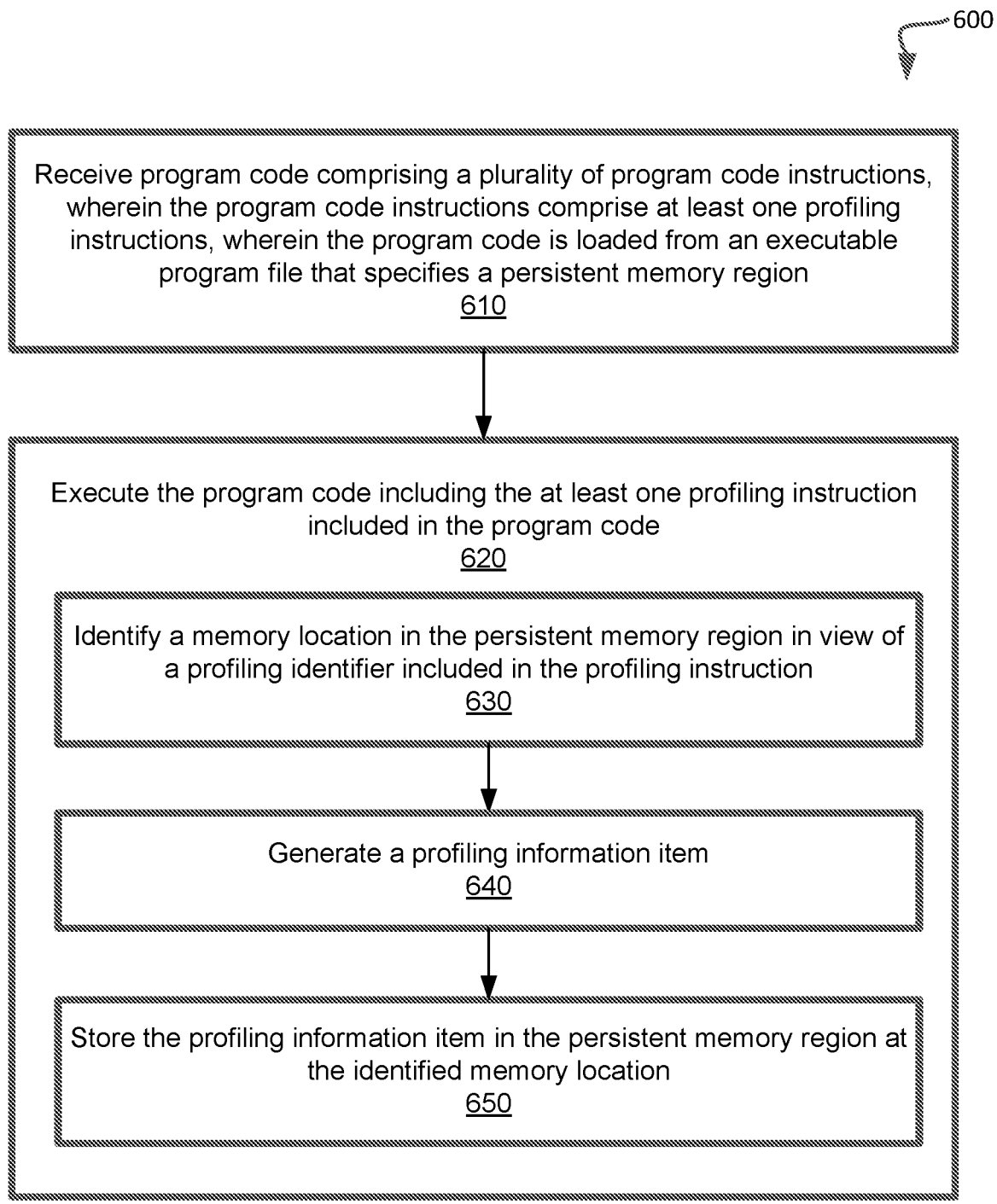
FIG. 6 depicts a flow diagram of an example method for generating optimized program code using profiling information read from a persistent memory region, in accordance with one or more aspects of the present disclosure.

FIG. 6 depicts a flow diagram of an example method 600 for adding profiling instructions that store profiling information in a persistent memory region to program code, in accordance with one or more aspects of the present disclosure. Method 600 and each of its individual functions, routines, subroutines, or operations may be performed by one or more processors of the computer device executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processes implementing method 600 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 600 may be performed by a computer system 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 600 may begin at operation 610. At operation 610, a processing device may receive program code comprising a plurality of program code instructions, wherein the program code instructions comprise at least one profiling instructions, wherein the program code is loaded from an executable program file that specifies a persistent memory region.

At operation 620, the processing device may execute the program code including the at least one profiling instruction included in the program code. To perform operation 620, the processing device may execute operations 630, 640, and 650. At operation 630, the processing device may identify a memory location in the persistent memory region in view of a profiling identifier included in the profiling instruction. At operation 640, the processing device may generate a profiling information item. At operation 650, the processing device may store the profiling information item in the persistent memory region at the identified memory location. Responsive to completing the operations described herein above with references to operation 650, the method may terminate.

Figure 7:
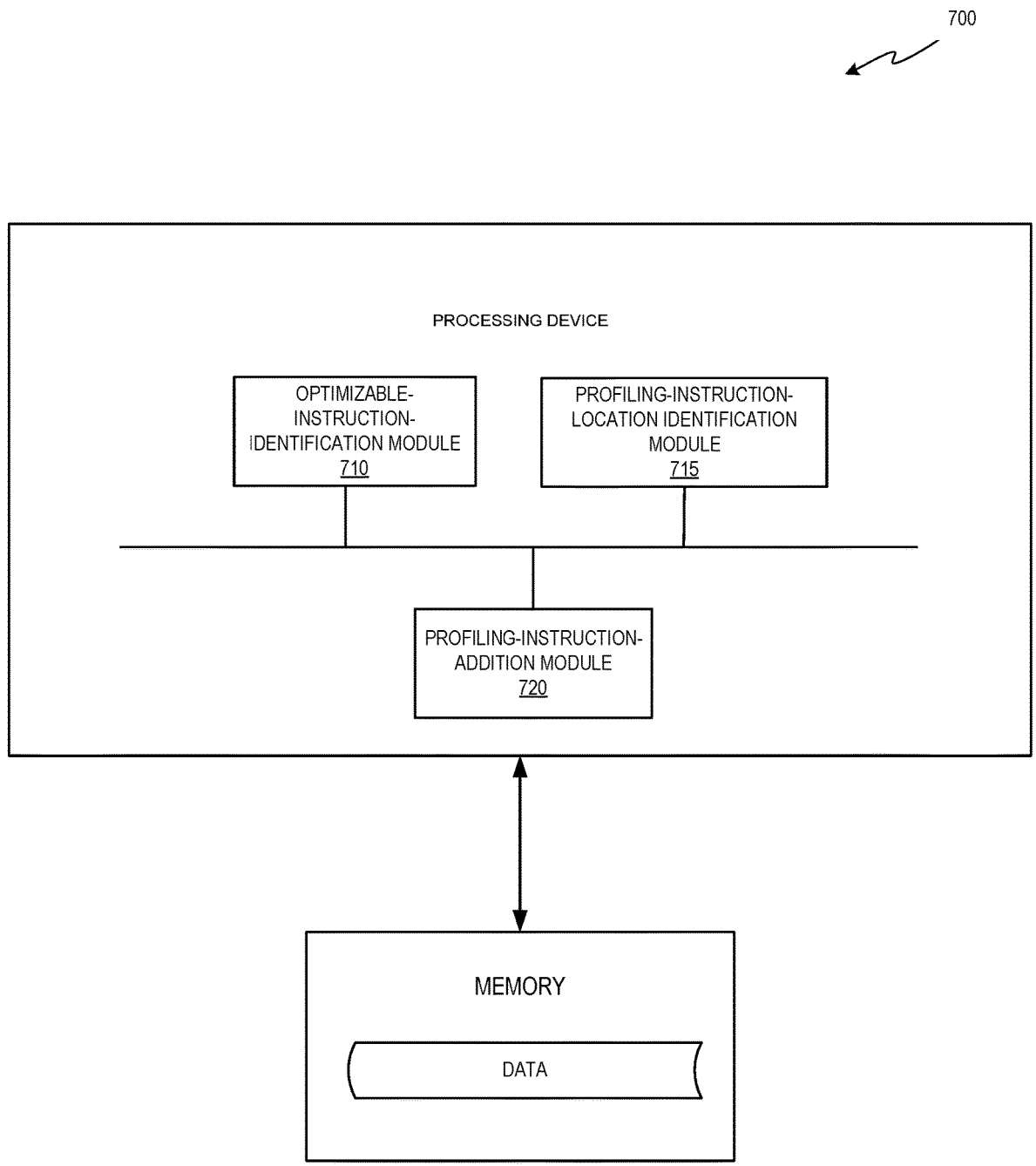
FIG. 7 depicts a block diagram of a computer system operating in accordance with one or more aspects of the present disclosure.

FIG. 7 depicts a block diagram of a computer system 700 operating in accordance with one or more aspects of the present disclosure. Computer system 700 may be the same or similar to computer system 100 of FIG. 1, and may include one or more processors and one or more memory devices. Each processor of the computer system 700 may be the same or similar to a physical processing device 154 of FIG. 1. The memory devices of the computer system 700 may be the same or similar to the memory 102 of FIG. 1. In the example shown, computer system 700 may include an optimizable-instruction identification module 710, a profiling-instruction-location identification module 715, and a profiling-instruction-addition module 720.

Optimizable-instruction-identification module 710 may enable a processor to identify, among the first program code instructions, one or more optimizable instructions, such that at least one of the optimizable instructions is associated with a first execution characteristic. Profiling-instruction-location identification module 715 may enable the processor to identify at least one profiling instruction location associated with the at least one of the optimizable instructions. Profiling-instruction-addition module 720 may enable the processor to add at least one profiling instruction to the first program code at the profiling instruction location, such that the profiling instruction includes at least one profiling identifier, and the at least one profiling instruction causes the processor to generate a profiling information item in view of the first execution characteristic of the at least one of the optimizable instructions and store the profiling information item in a persistent memory region at a memory location that corresponds to the profiling identifier.

Figure 8:
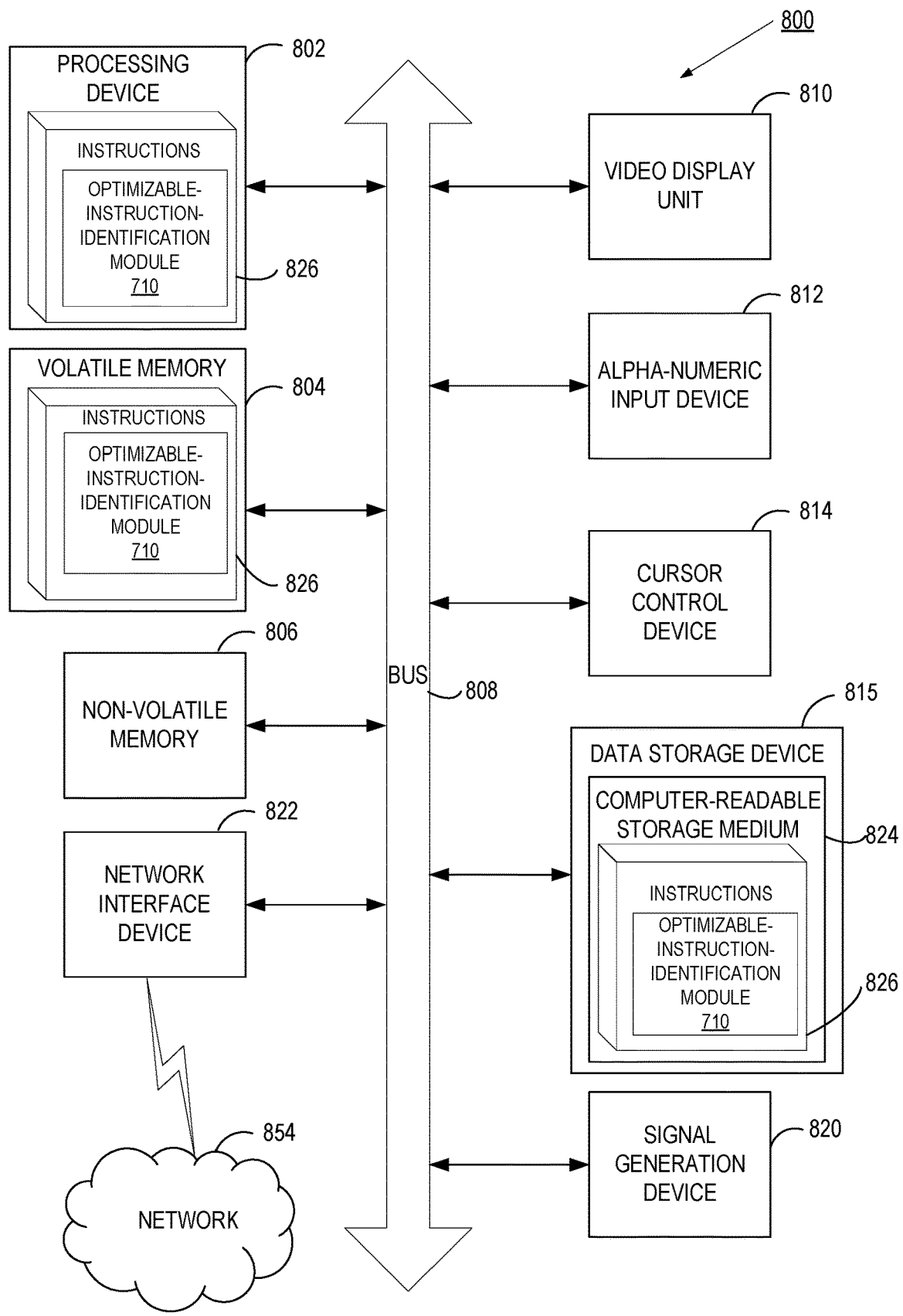
FIG. 8 depicts a block diagram of an example computer system operating in accordance with one or more aspects of the present disclosure.

FIG. 8 depicts a block diagram of a computer system operating in accordance with one or more aspects of the present disclosure. In various illustrative examples, computer system 800 may correspond to computing device 100 of FIG. 1. Computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing method 400 or 500.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: receiving, by a processing device, first program code comprising a first plurality of program code instructions, the first program code instructions generated by a compiler in view of source code; identifying, among the first program code instructions, one or more optimizable instructions, wherein at least one of the optimizable instructions is associated with a first execution characteristic, and the first execution characteristic is associated with an optimization decision; identifying at least one profiling instruction location associated with the at least one of the optimizable instructions, and adding at least one profiling instruction to the first program code at the profiling instruction location, wherein the at least one profiling instruction comprises at least one profiling identifier, and wherein the at least one profiling instruction causes the processing device to: generate a profiling information item in view of the first execution characteristic of the at least one of the optimizable instructions, and store the profiling information item in a persistent memory region at a memory location that corresponds to the profiling identifier.

Example 2 is the method of Example 1, wherein the first execution characteristic of the at least one of the optimizable instructions reflects a frequency of execution of the one or more optimizable instructions.

Example 3 is the method of Example 1, wherein the optimization decision comprises a determination, made in view of the first execution characteristic, whether to generate one or more optimized instructions that replace the one or more optimizable instructions.

Example 4 is the method of Example 3, wherein at least one of the one or more optimized instructions is associated with a second execution characteristic that is different from the first execution characteristic of the at least one of the optimizable instructions.

Example 5 is the method of Example 4, wherein execution of the one or more optimized instructions uses less processor time for a particular input than execution of the one or more optimizable instructions for the particular input.

Example 6 is the method of Example 4, wherein the one or more optimized instructions comprise fewer instructions than the one or more optimizable instructions.

Example 7 is the method of Example 3, further comprising: executing, by the processing device, the first program code, wherein the first program code comprises the at least one profiling instruction; and generating, by the compiler, second program code comprising a second plurality of program code instructions in view of the source code, wherein generating the second program code comprises: determining whether to generate the optimized instructions in view of the profiling information item stored in the persistent memory region at the memory location that corresponds to the profiling identifier, and responsive to determining that the optimized instructions are to be generated, generating the optimized instructions, wherein the second plurality of program code instructions comprises the optimized instructions.

Example 8 is the method of Example 7, wherein determining whether to generate the optimized instructions comprises determining whether the profiling information item satisfies a threshold condition.

Example 9 is the method of Example 8, wherein the threshold condition comprises a threshold value, the profiling information item comprises a counter value, and the threshold condition is satisfied responsive to the counter value meeting or exceeding the threshold value.

Example 10 is the method of Example 7, further comprising: responsive to determining that the optimized instructions are not to be generated, generating one or more alternative program code instructions in view of the source code, wherein the alternative program code instructions have one or more different execution characteristics than the optimized instructions.

Example 11 is the method of Example 1, wherein the profiling instruction location is provided by the compiler, and the profiling instruction location corresponds to one or more of the program code instructions that affect the optimization decision made by the compiler.

Example 12 is the method of Example 11, wherein the one or more program code instructions that affect the optimization decision comprise an instruction associated with a conditionally-executed block of one or more of the first program code instructions.

Example 13 is the method of Example 1, wherein the profiling identifier comprises an identifier value that is incremented for each profiling instruction added to the first generated program code.

Example 14 is the method of Example 1, wherein the profiling information item comprises a counter value that is incremented each time the profiling instruction is executed.

Example 15 is the method of Example 14, wherein the at least one profiling instruction invokes a plurality of additional profiling instructions, the additional profiling instructions comprising: identifying, in view of the profiling identifier, the memory location that corresponds to the profiling identifier; determining an updated value of a counter stored at the memory location that corresponds to the profiling identifier; and storing the updated value of the counter at the memory location that corresponds to the profiling identifier.

Example 16 is the method of Example 1, wherein the profiling information item comprises a plurality of counter values, and each counter value is incremented in response to a condition associated with the counter value being satisfied each time the profiling instruction is executed.

Example 17 is the method of Example 1, wherein the memory location comprises a sum of a base address of the persistent memory region and an offset determined in view of the profiling identifier.

Example 18 is the method of Example 1, further comprising: determining a size of the persistent memory region in view of a sum of sizes of generated profiling information items. Alternatively or additionally, the size of the persistent memory region may be determined by multiplying a size of each profiling information item by a number of profiling information items generated by the at least one profiling instruction; and generating an executable file comprising the first program code and an indication of the size of the persistent memory region.

Example 19 is the method of Example 18, wherein the indication of the size of the persistent memory region is determined by a linker in view of information provided by the compiler, wherein the information provided by the compiler comprises a number of profiling information items and a size of each profiling information item.

Example 20 is a system comprising: a memory; and a processing device operatively coupled to the memory, wherein the processing device processes instructions synchronously in accordance with a processor clock, the processing device to: receive program code comprising a plurality of program code instructions, wherein the program code instructions comprise at least one profiling instructions, wherein the program code is loaded from an executable program file that specifies a persistent memory region; and execute the program code including the at least one profiling instruction included in the program code, wherein to execute the profiling instruction, the processing device is to: identify a memory location in the persistent memory region in view of a profiling identifier included in the profiling instruction, generate a profiling information item, and store the profiling information item in the persistent memory region at the identified memory location.

Example 21 is the system of Example 20, wherein the processing device is further to: receive, from an operating system kernel, a pointer to the persistent memory region.

Example 22 is the system of Example 21, wherein to identify the memory location in the persistent memory region, the processing device is to: determine the identified memory location as a sum of the pointer to the persistent memory region and an offset determined in view of the profiling identifier.

Example 23 is the system of Example 22, wherein to identify the memory location in the persistent memory region, the processing device is to: determine a product of the profiling identifier and a size of the profiling information item.

Example 24 is the system of Example 20, wherein to generate a profiling information item, the processing device is further to increment a value stored at the memory location.

Example 25 is the system of Example 20, wherein to increment a value stored at the identified memory location, the processing device is further to: read the value stored at the identified memory location; and update the value stored at the identified memory location in view of a sum of the value stored at the memory location and an increment value.

Example 26 is the system of Example 20, wherein the profiling instruction is associated with a parameter that specifies a particular memory location, and to generate a profiling information item, the processing device is further to: read the value of a particular memory location; generate at least one result value in view of the value of the particular memory location; and store the at least one result value at the identified memory location.

Example 27 is the system of Example 26, wherein to store the at least one result value at the identified memory location, the processing device is further to: determine whether a condition associated with the profiling instruction is satisfied; and responsive to determining that the condition is satisfied, store the at least one result value at the identified memory location.

Example 28 is the system of Example 2, wherein the profiling information item comprises a plurality of counter values, and to generate a profiling information item, the processing device is further to: increment each counter value in response to a condition associated with the counter value being satisfied.

Example 29 is a non-tangible, computer-readable medium storing instructions that, when executed by a processing device, cause the processing device to: execute, by a processing device, first program code that comprises the at least one profiling instruction, wherein the profiling instruction generates a profiling information item and stores the profiling information item in a persistent memory region at a memory location that corresponds to a profiling identifier associated with the profiling instruction; and generate, by a compiler, second program code comprising a second plurality of program code instructions in view of source code associated with the first program code, wherein generating the second program code comprises: determining whether to generate one or more optimized instructions in view of the profiling information item stored in the persistent memory region at the memory location that corresponds to the profiling identifier, and responsive to determining that the optimized instructions are to be generated, generating the optimized instructions, wherein the second plurality of program code instructions comprises the optimized instructions.

Example 30 is the computer-readable medium of Example 29, wherein determining whether to generate the optimized instructions comprises determining whether the profiling information item satisfies a threshold condition.

Example 31 is the computer-readable medium of Example 30, wherein the threshold condition comprises a threshold value, the profiling information item comprises a counter value, and the threshold condition is satisfied responsive to the counter value meeting or exceeding the threshold value.

Example 32 is a method comprising: receiving, by a processing device, first program code comprising a first plurality of program code instructions, the first program code instructions generated by a compiler in view of source code; identifying, in the first program code instructions, at least one profiling instruction location that corresponds to an optimization decision to be made by the compiler, wherein the optimization decision comprises a determination as to whether to generate one or more optimized program code instructions that correspond to a portion of the source code; and adding at least one profiling instruction to the first program code at the profiling instruction location, wherein the at least one profiling instruction comprises at least one profiling identifier, wherein the at least one profiling instruction stores a profiling information item in a persistent memory region at a memory location that corresponds to the profiling identifier.

Example 33 is the method of Example 32, wherein the profiling instruction location corresponds to one or more of the program code instructions that affect the optimization decision made by the compiler, wherein the compiler generates second program code in view of the optimization decision.

Example 34 is the method of Example 33, wherein the profiling instruction location is adjacent to one of the program code instructions in view of which the optimization decision is made by the compiler.

Example 35 is the method of Example 32, further comprising: generating an executable file comprising the first program code instructions and an indication of a size of the persistent memory region.

Example 36 is the method of Example 35, wherein the indication of the size of the persistent memory region is determined by a linker in view of information provided by the compiler, wherein the information provided by the compiler comprises a number of profiling information items and a size of each profiling information item.

Example 37 is an apparatus, comprising: means for receiving, by a processing device, first program code comprising a first plurality of program code instructions, the first program code instructions generated by a compiler in view of source code; means for identifying, among the first program code instructions, one or more optimizable instructions, wherein at least one of the optimizable instructions is associated with a first execution characteristic, and the first execution characteristic is associated with an optimization decision, wherein the optimization decision comprises a determination, made in view of the first execution characteristic, whether to generate one or more optimized instructions that replace the one or more optimizable instructions; means for identifying at least one profiling instruction location associated with the at least one of the optimizable instructions, and means for adding at least one profiling instruction to the first program code at the profiling instruction location, wherein the at least one profiling instruction comprises at least one profiling identifier.

Example 38 is the apparatus of Example 37, wherein the at least one profiling instruction comprises: means for generating a profiling information item in view of the first execution characteristic of the at least one of the optimizable instructions, and means for storing the profiling information item in a persistent memory region at a memory location that corresponds to the profiling identifier.

Example 39 is the apparatus of Example 37, wherein the first execution characteristic of the at least one of the optimizable instructions reflects a frequency of execution of the one or more optimizable instructions.

Example 40 is the apparatus of Example 39, wherein at least one of the one or more optimized instructions is associated with a second execution characteristic that is different from the first execution characteristic of the at least one of the optimizable instructions.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 400, or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, by a processing device, first program code comprising a first plurality of program code instructions, the first program code instructions generated by a compiler in view of source code, wherein the first program code includes a function inlining optimization decision;
    identifying, among the first program code instructions, one or more optimizable instructions, wherein at least one of the optimizable instructions is associated with a first execution characteristic, and the first execution characteristic is associated with the optimization decision;
    identifying at least one profiling instruction location associated with the at least one of the optimizable instructions; and
    adding at least one profiling instruction to the first program code at the profiling instruction location, wherein the at least one profiling instruction comprises at least one profiling identifier, and wherein the at least one profiling instruction causes the processing device to:
        generate a profiling information item in view of the first execution characteristic of the at least one of the optimizable instructions, and
        store the profiling information item in a persistent memory region at a memory location that corresponds to the profiling identifier.

2. The method of claim 1, wherein the first execution characteristic of the at least one of the optimizable instructions reflects a frequency of execution of the one or more optimizable instructions.

3. The method of claim 1, wherein the optimization decision comprises a determination, made in view of the first execution characteristic, whether to generate one or more optimized instructions that replace the one or more optimizable instructions.

4. The method of claim 1, wherein the profiling instruction location is provided by the compiler, and the profiling instruction location corresponds to one or more of the program code instructions that affect the optimization decision made by the compiler.

5. The method of claim 4, wherein the one or more program code instructions that affect the optimization decision comprise an instruction associated with a conditionally-executed block of one or more of the first program code instructions.

6. The method of claim 1, wherein the profiling identifier comprises an identifier value that is incremented for each profiling instruction added to the first generated program code.

7. The method of claim 1, wherein the profiling information item comprises a counter value that is incremented each time the profiling instruction is executed.

8. The method of claim 7, wherein the at least one profiling instruction invokes a plurality of additional profiling instructions, the additional profiling instructions comprising:
    identifying, in view of the profiling identifier, the memory location that corresponds to the profiling identifier;
    determining an updated value of a counter stored at the memory location that corresponds to the profiling identifier; and
    storing the updated value of the counter at the memory location that corresponds to the profiling identifier.

9. The method of claim 1, wherein the memory location comprises a sum of a base address of the persistent memory region and an offset determined in view of the profiling identifier.

10. The method of claim 1, further comprising:
    determining a size of the persistent memory region in view of a sum of sizes of generated profiling information items; and
    generating an executable file comprising the first program code and an indication of the size of the persistent memory region.

11. A system comprising:
a memory; and
a processing device operatively coupled to the memory, wherein the processing device processes instructions synchronously in accordance with a processor clock, the processing device to:
- receive first program code comprising a first plurality of program code instructions, the first program code instructions generated by a compiler in view of source code, wherein the first program code includes a function inlining optimization decision;
- identify, among the first program code instructions, one or more optimizable instructions, wherein at least one of the optimizable instructions is associated with a first execution characteristic, and the first execution characteristic is associated with the optimization decision;
- identify at least one profiling instruction location associated with the at least one of the optimizable instructions; and
- add at least one profiling instruction to the first program code at the profiling instruction location, wherein the at least one profiling instruction comprises at least one profiling identifier, and wherein the at least one profiling instruction causes the processing device to:
  - generate a profiling information item in view of the first execution characteristic of the at least one of the optimizable instructions, and
  - store the profiling information item in a persistent memory region at a memory location that corresponds to the profiling identifier.

12. The system of claim 11, wherein the first execution characteristic of the at least one of the optimizable instructions reflects a frequency of execution of the one or more optimizable instructions.

13. The system of claim 11, wherein the optimization decision comprises a determination, made in view of the first execution characteristic, whether to generate one or more optimized instructions that replace the one or more optimizable instructions.

14. The system of claim 11, wherein the profiling instruction location is provided by the compiler, and the profiling instruction location corresponds to one or more of the program code instructions that affect the optimization decision made by the compiler.

15. The system of claim 14, wherein the one or more program code instructions that affect the optimization decision comprise an instruction associated with a conditionally-executed block of one or more of the first program code instructions.

16. The system of claim 11, wherein the profiling identifier comprises an identifier value that is incremented for each profiling instruction added to the first generated program code.

17. The system of claim 11, wherein the profiling information item comprises a counter value that is incremented each time the profiling instruction is executed.

18. The system of claim 11, wherein the memory location comprises a sum of a base address of the persistent memory region and an offset determined in view of the profiling identifier.

19. The system of claim 11, wherein the processing device is further to:
- determine a size of the persistent memory region in view of a sum of sizes of generated profiling information items; and
- generate an executable file comprising the first program code and an indication of the size of the persistent memory region.

20. A non-transitory, computer-readable storage medium storing instructions that, when executed by a processing device, cause the processing device to:
- receive first program code comprising a first plurality of program code instructions, the first program code instructions generated by a compiler in view of source code, wherein the first program code includes a function inlining optimization decision;
- identify, among the first program code instructions, one or more optimizable instructions, wherein at least one of the optimizable instructions is associated with a first execution characteristic, and the first execution characteristic is associated with the optimization decision;
- identify at least one profiling instruction location associated with the at least one of the optimizable instructions; and
- add at least one profiling instruction to the first program code at the profiling instruction location, wherein the at least one profiling instruction comprises at least one profiling identifier, and wherein the at least one profiling instruction causes the processing device to:
  - generate a profiling information item in view of the first execution characteristic of the at least one of the optimizable instructions, and
  - store the profiling information item in a persistent memory region at a memory location that corresponds to the profiling identifier.

* * * * *